J. CURTIS.

Carriage.

No. 3,590. Reissued Aug. 10, 1869.

Witnesses:
Jas. H. Lagman
H. C. Webber

Inventor:
John Curtis
By Knight Bros.
Attorneys.

N. PETERS, Photo-Lithographer, Washington, D. C.

United States Patent Office.

JOHN CURTIS, OF CINCINNATI, OHIO.

*Letters Patent No.* 63,223, *dated March* 26, 1867; *reissue No.* 3,590, *dated August* 10, 1869.

IMPROVEMENT IN CARRIAGES.

The Schedule referred to in these Letters Patent and making part of the same.

*To whom it may concern:*

Be it known that I, JOHN CURTIS, of Cincinnati, Hamilton county, Ohio, have invented a new and useful Improvement in Wheel-Carriages; and I hereby declare the following to be a full, clear, and exact description thereof, reference being had to the accompanying drawings, making part of this specification.

This is an improvement in the construction of that class of wheel-carriages whose body is supported on two (so called) elliptical springs; and My invention consists, first, in the provision of two pieces of hickory, or other tough, and elastic wood, so formed and applied as to take the place of eight essential members of every spring-vehicle of customary construction, namely, the two sills, the two spring-bars, and four body-loops, or bent iron rods, which serve to connect the body to the spring-bars.

Moreover, a carriage-body, formed and supported on my plan, is perfectly smooth and flush underneath, and, with the exception of the two regular stay-bolts, free from any bolts, nuts, or bars, or metal straps, which at present, besides forming a material part of the cost of a customary body, present unsightly projections, and add greatly to the weight, and are liable to work loose and rattle. In other words, The first part of my improvement consists essentially of a strip, or strips, of tough and elastic wood, bent into suitable form, hereinafter explained, and inserted in and forming a part of the body of the vehicle, and extending in a bowed or curved form in front of, and behind it, so as to be attached to the ordinary springs, and thus to dispense with those separately-attached metallic portions, necessarily used, and known as body-loops, as well as with separate spring-bars, together with the numerous bolts (usually sixteen or eighteen in number,) heretofore required to secure the loops and the bars, and, in addition to these advantages, the said strips, from the nature of the material, afford a yielding or elastic connection between the body and the springs, so as to relieve a portion of the jar now wholly devolving upon the springs proper, and to increase the safety and durability, with a material reduction of weight, cost of construction, and an improvement in appearance.

The second part of my invention consists in the provision of a single strip of tough and stiff wood, so bent and attached as to perform the functions of the ordinary double perch, and, also, those of the upper member of the fifth-wheel, and which, by the avoidance of any mortise in the head-block, or piece connecting the fifth-wheel and fore-spring, enables said block, as well as the fifth-wheel itself, to be made much lighter, simpler, and more compactly, with equal or greater strength, and without the numerous bolts, clips, and other metallic appendages.

The third part of my invention consists in the provision of a guard-iron, or stay, adapted to hold the upper and lower members of the fifth-wheel together, in such a manner as to prevent the rattling thereof, and to afford a means of rectifying, at any moment, the slackness of these important members, incident to the wear and tear of ordinary use.

Figure 1:
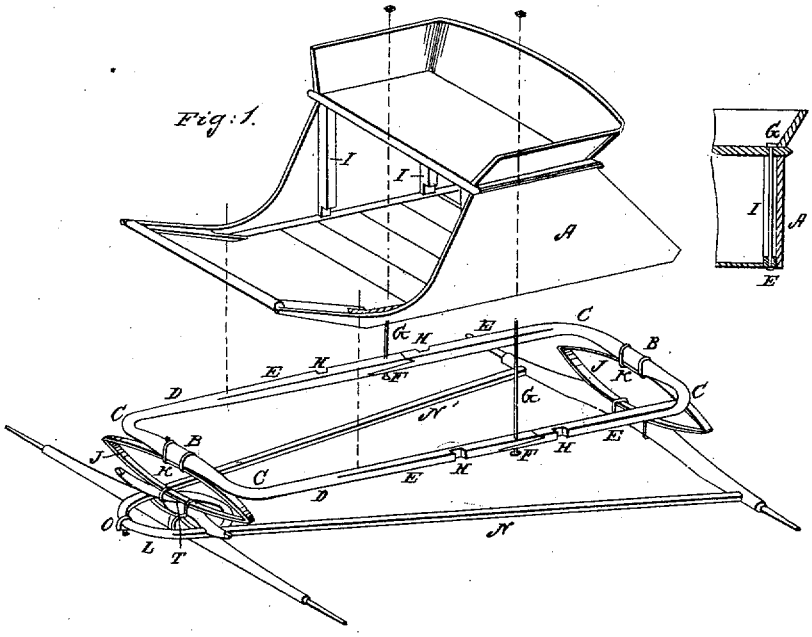
Figure 1 is a perspective view, representing the body and carriage-part detached, and with the addition of a transverse section of one side of the body.
Figure 2:
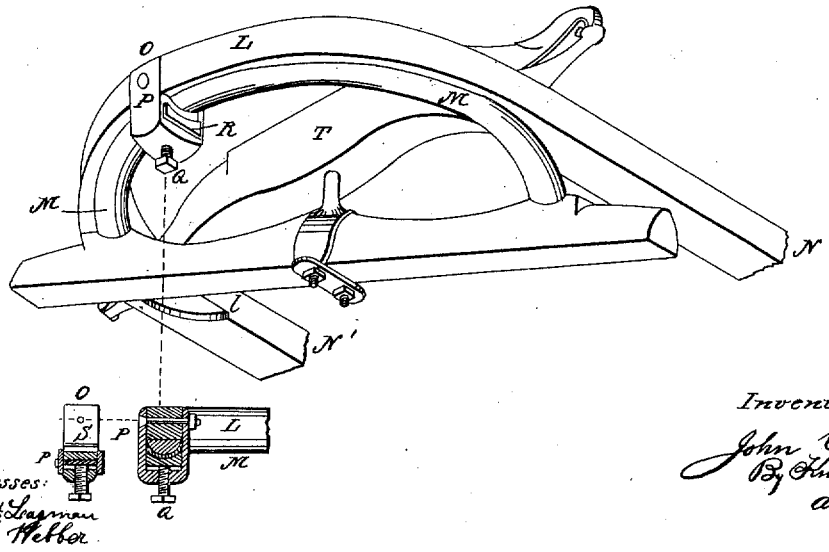
Figure 2 is an under-side perspective view of my combined fifth-wheel and double perch, together with cross-sections of the guard-iron and accessories.

The body A may be of customary construction, except that its sill-pieces are prolonged in front and rear beyond the body, so as to form a strong, simple, and elastic connection with the front and rear springs respectively. The said sill-pieces consist of two strips of hickory, or other tough and elastic wood, bent into the form represented, their middle-portions, B, taking the place, and discharging the functions, of the customary spring-bars, and merging, by easy curves C, into straight portions, whose parts D, extending beyond the body, take the place, and discharge the functions, of body-loops, and, in addition to those functions, serve, by their elasticity, to relieve the springs proper of a portion of their resilient duty, and whose parts E, being scarfed together at F, and traversed at said scarfs by the ordinary stay-bolts G, form that portion of the carriage-body known as the sills.

Gains H, in the edges of the parts E, receive the tenons of the uprights I.

The portions B are secured to the springs J by the customary clips K.

The second part of my invention is as follows:

In place of a single perch, with stay-braces, or of two separate perches, mortised into and weakening the head-block, and necessitating a distinct metallic ring, and its accessories, for the upper member of the fifth-wheel, I provide a single strip of tough timber, whose middle portion L is bent to a semicircle, and rebated, *l*, to take the metallic lower portion M of the fifth-wheel (which portion may be either of the represented C-form, as in the illustration or circular,) and whose side portions, N N′, diverge rearwardly, and are mortised into, or otherwise firmly fastened to the hind axle. The head-block T, instead of being mortised (and thereby weakened) to receive the front ends of the perches, is simply fastened to the upper side of the strip, where the curved portion L merges into the straight portions N N′.

To enable the two members of the fifth-wheel to be set up as they wear, and to avoid all erratic or noisy movements thereof, I have provided what I style a stay, or guard-iron, O, consisting of a clip or strap, P, which embraces, and is bolted, or riveted, or otherwise secured to the middle portion of the upper member L of the fifth-wheel.

A set-screw, Q, tapped within the strap P, presses upward a gland, R, which is hollowed to correspond with the convexity of the lower member M of the fifth-wheel.

A pad or cushion, S, of leather or caoutchouc, or other tough, but flexible substance, is interposed between the gland R and the member M, and, besides holding the two members snugly together, prevents all rattling, &c., as before stated.

The guard O may be used to set up the member M, either with or without the pad S, and is applicable to every kind of a wheel-carriage where a fifth-wheel is employed. Where the fifth-wheel is circular, as with the heavier description of carriages, the guard may be advantageously placed at the rear side of the circle. In case of the king-bolt breaking, the guard O will serve to hold the two members of the fifth-wheel securely together, and thus prevent the serious casualties that sometimes arise from the giving way of this important bolt.

My fifth-wheel, having its upper member formed by the semicircular junction of the two perches, and leaving its convexity presented forward, is, compared with the customary D-formed lower member, (whose convexity is rearward,) greatly more staunch, partly because of its rigid oneness with the perches, and partly because of its tendency to hug, rather than separate from, the other member, resulting in a smoother motion and less strain on the clip.

The form selected to illustrate this invention is that which practical test has proved to be effective; but I do not desire to restrict myself absolutely thereto, so long as I attain the same results by means substantially equivalent.

I claim herein as new, and of my invention—

1. The bent strip or strips B C D E of elastic timber, or its equivalent, forming the sills of the body proper, and to take the place of the spring-bar and body-loops, as and for the purpose set forth.

2. The bent and rebated strip or strips L *l* N N′, or their equivalents, discharging the functions of the double perch and the upper member of the fifth-wheel, as set forth.

3. The arrangement of strap P, screw Q, and gland R, or their mechanical equivalent, to enable the members of a fifth-wheel to be set up as they wear, in the manner explained.

4. In the described combination, with the elements of claim third, the pad or cushion S, for the purpose stated.

In testimony of which invention, I hereunto set my hand.

JOHN CURTIS.

Witnesses:
GEO. H. KNIGHT,
JAMES H. LAYMAN.